United States Patent [19]
Zhong et al.

[11] Patent Number: 5,319,041
[45] Date of Patent: Jun. 7, 1994

[54] PROCESS FOR THE PREPARATION OF VINYLPYRROLIDONE/VINYL ACETATE COPOLYMERS

[75] Inventors: Yuanzhen Zhong, Wayne, N.J.; Hemant Parikh, Harriman, N.Y.; Paul D. Taylor, West Milford, N.J.; Terry E. Smith, Murray, Ky.

[73] Assignee: ISP Investments Inc., Wilmington, Del.

[21] Appl. No.: 38,723

[22] Filed: Mar. 26, 1993

[51] Int. Cl.$^5$ .......................... C08F 2/00; C08F 2/06; C08F 4/34; C08F 4/04; C08F 226/10; C08F 218/08

[52] U.S. Cl. .................................. 526/73; 526/212; 526/218.1; 526/227; 526/330; 526/264

[58] Field of Search .............. 526/264, 73, 212, 218.1, 526/227, 330

[56] References Cited

U.S. PATENT DOCUMENTS

| | | | |
|---|---|---|---|
| 2,667,473 | 1/1954 | Mormer et al. | 260/85.7 |
| 3,862,915 | 1/1975 | Fried et al. | 260/29.6 |
| 4,520,179 | 5/1985 | Barabas et al. | 526/212 |
| 4,554,311 | 11/1985 | Barabas et al. | 524/808 |
| 5,122,582 | 6/1992 | Potthoff-Karl et al. | 526/81 |
| 5,130,388 | 7/1992 | Shih | 526/228 |

FOREIGN PATENT DOCUMENTS 1323028  7/1973  United Kingdom.

*Primary Examiner*—Joseph L. Schofer
*Assistant Examiner*—Wu C. Cheng
*Attorney, Agent, or Firm*—Marilyn J. Maue; Joshua J. Ward

[57] ABSTRACT

This invention relates to an improved process for producing a clear solution of vinylpyrrolidone (VP) and vinyl acetate (VA) monomers which comprises, in an anhydrous system, (a) reacting a $C_2$ to $C_3$ alcoholic solution containing said VA monomer and between about 60 and about 80 wt. % portion of total VP monomer in the presence of between about 0.05 and about 0.3 wt. % of a free radical initiator selected from the group consisting of tertamylperoxy pivalate and 2,2-azobis(2-methylbutyronitrile) or a mixture thereof for a period of from about 5 to about 10 hours, at a temperature between about 60° and about 110° C.;

(b) gradually adding the remaining VP monomer in $C_2$ to $C_3$ alcohol solution at reaction temperature after the addition of the VA monomer is complete;

(c) raising the temperature of the resulting reaction mixture to between about 110° and about 150° C.;

(d) continuing the polymerization reaction at said higher temperature in the presence of from about 0.11 to about 0.6 wt. %, based on total monomers, of 2,5-dimethyl-2,5-bis(tert-butylperoxy) hexane and (e) cooling the resulting reaction mixture and recovering a homogeneous VP/VA copolymer $C_2$ to $C_3$ alcohol solution containing less than 100 ppm of residual vinylpyrrolidone monomer or vinyl acetate residual monomer.

14 Claims, No Drawings

PROCESS FOR THE PREPARATION OF VINYLPYRROLIDONE/VINYL ACETATE COPOLYMERS

BACKGROUND OF THE INVENTION

Vinylpyrrolidone (VP)/vinyl acetate (VA) copolymers, which can be supplied in the form of a powder or solutions, are much in demand for use in the pharmaceutical, cosmetic or related arts which require little or no toxicity. These copolymers are also useful as adhesives and abrasion resistant coatings having a glossy, colorless appearance and wherein the degree of water solubility can be varied with the concentration of VP monomer and the homogeneous distribution of VP in the copolymeric product.

Several methods of copolymerization have been employed to satisfy the many uses of this copolymer which, theoretically, can contain from 20 to 80% VP concentration. one process is described in U.S. Pat. No. 2,667,473 which is carried out using benzene solvent in the presence of hydrogen peroxide or azobis(isobutyramide) free radical initiator. This process encounters several difficulties involving the handling of the initiator which is highly insoluble. Furthermore, both initiator and solvent are toxic so that extreme care is required for product purification. Replacement of azobis(isobutyramide), referred to herein as AIBN, with non-toxic t-butylperoxy pivalate and benzene with aqueous isopropanol has been described in U.S. Pat. No. 4,554,311. However, this process involves a large initial charge of monomers to the reactor prior to contact with initiator; and since VP monomer is significantly more reactive than VA, initial stages of the polymerization produce chains rich in VP and, only in the later polymerization stages, is the VP/VA copolymeric portion of the heterogeneous product formed, resulting in a water insoluble product. Homogeneity in the copolymeric structure, i.e. the copolymer having a uniform distribution of VP and VA monomer units in its macromolecular chain structure, is highly desirable from the standpoint of water solubility.

British Pat. No. 1,323,028 describes a homogeneous VP/VA copolymer prepared by an intricate process employing a continuous phase in which VP is soluble and a disperse phase in which VA is suspended. Copolymerization takes place exclusively in the disperse phase while the continuous phase functions as a VP reservoir. Although successful in producing a homogeneous product, this process, using AIBN initiator is extremely limited in the choice of solvents for the disperse phase, e.g. benzene, toluene and for the continuous phase, e.g. acids or polyols, and is further complicated by the need for the removal of both solvent and substantial portions of VP monomer in the continuous phase for recovery of product. Additionally, this process employing the VA reservoir, fails to maximize the reactive efficiency of the VA monomer.

Accordingly, it is an object of the present invention to overcome the above problems and to produce a substantially homogeneous VP/VA copolymer over a broad range of VP concentrations and polymeric K values of between about 10 to about 100.

Another object is to provide a process for the preparation of a substantially homogeneous VP/VA copolymers by a simplified and economical process which is readily adaptable to commercial use.

Still another object is to provide a copolymerization process for inline control of VP concentration in the VP/VA copolymeric macromolecular product.

These and other objects of the invention will become apparent from the following description and disclosure.

THE INVENTION

In accordance with the present invention there is provided an anhydrous process for the polymerization of VP and VA monomers to produce a homogeneous copolymer solution in high purity, containing less than 100 ppm of residual VP or VA monomers which comprises:

(a) reacting a $C_2$ to $C_3$ alcoholic solution containing said VA monomer and between about 60 and about 80 wt. % portion of total VP monomer in the presence of between about 0.05 and about 0.3 wt. % of a free radical initiator selected from the group consisting of tertamylperoxy pivalate and 2,2-azobis(2-methylbutyronitrile), or a mixture thereof, for a period of from about 5 to about 10 hours, at a temperature between about 60° and about 110° C.;

(b) gradually adding the remaining VP monomer in $C_2$ to $C_3$ alcohol solution at reaction temperature after the addition of the VA monomer is complete;

(c) raising the temperature of the resulting reaction mixture to between about 110° and about 150° C.;

(d) continuing the polymerization reaction at said higher temperature in the presence of from about 0.11 to about 0.6 wt. %, based on total monomers, of 2,5-dimethyl-2,5-bis(tert-butylperoxy) hexane and (e) cooling the resulting reaction mixture and recovering a homogeneous VP/VA copolymer.

In the above process the alcohol solvent is ethanol or isopropanol. The solvent is used to dissolve VP and VA monomers which are introduced in desired proportions of 20 to 80% VP and 80 to 20% VA. Between about 50 and about 80 wt. % solutions, preferably between about 60 and about 70 wt. % solutions, of monomer and comonomer are employed in the operation of the present process. During reaction, the concentration of monomers is desirably between about 50 and about 80% of the total reaction mixture.

The introduction of 2,5-dimethyl-2,5-bis(tertbutylperoxy) hexane initiator is critical in the present operation since it effectively reduces the amount of residual VA or VP monomer content to below 100 ppm in the synthesis of a highly purified homogeneous copolymeric product. This initiator can be added to the system, separately or in admixture with the tert-amylperoxy pivalate and/or 2,2-azobis(2-methylbutyronitrile) initiators before or after the reaction temperature is elevated. Also, additional solvent can be added during polymerization as needed to maintain a desired K value or liquid viscosity. Also, the concentration of the dimethyl bis(t-butylperoxy) hexane at the high temperature is important since below 0.11 wt. % the residual monomer exceeds the desired contaminant level. However, amounts above 0.6 wt. % causes problems in initiator removal from the copolymer which lead to gradual initiator by-product contamination.

The addition of between about 20 and about 40 wt. % of VP after the addition of VA monomer has been completed is critical to the homogeneity of the water soluble polymeric product as opposed to relative water insolubility of the heterogeneous VP/VA copolymers previously produced.

Preferred conditions for the present process include reaction periods at the lower and higher temperature stages of from 6 to 8 hours each and initiator concentrations of from about 0.15 to about 0.5 wt. % based on total monomers. More desirably, the lower temperature reaction is carried out at between about 65° and about 85° C.; whereas the higher temperature reaction is usually at between about 120° and about 135° C.

In the preferred embodiment of the present process, a minor portion of the initiator or initiator mixture, and the solution of VP and VA, usually in the proportions desired for the copolymeric product, are precharged to the reactor under a blanket of nitrogen, or other inert gas, before reaction temperature is reached. The amount of precharge can be between about 5 and about 30% of the total charge to the reactor. This premixing step helps to ensure a clear, low-color copolymeric product upon completion of the copolymerization reaction.

As noted above, previously suggested free radical initiators for initiating polymerization of vinylpyrrolidone and vinyl acetate to form vinylpyrrolidone/vinyl acetate copolymer have not for one reason or other proven entirely satisfactory. It has now been found that the disadvantages inherent in use of the previously suggested initiators can be avoided by the present use of a combination of distinctly different initiators in a low temperature-high temperature staged reaction. Since the present initiators do not produce toxic decomposition products, instant process can be used to produce pharmaceutical grade VP/VA over a wide range of K values from 10 to 100 which corresponds to a number average molecular weight range of from 6,000 to 450,000. In general, for copolymers of higher K value above 50, temperatures within the lower portion of the above range and lower solvent concentrations are employed. Proportionately opposite conditions are observed for lower K value products. Also, the concentration of VP in the copolymer is easily regulated by controlling proportions in the initial reactor feed or by increasing or decreasing the amount of VP added after VA addition is complete.

Advantages of the present process are realized in significant shortening of reaction time; product purity, i.e. less than 100 Ppm residual vp or VA monomer; avoidance of toxic tetramethylsuccinonitrile formation as a decomposition product of azobis(isobutyronitrile), substantial homogeneity of the copolymeric product and control of VP and VA monomer ratio over a relatively broad range Of copolymer K values.

Having thus generally described the invention, reference is now had to the following examples which provide comparisons with other polymerization initiators and which set forth preferred embodiments. These examples are not to be construed as limiting to the scope of the invention which is more broadly described above and is defined in the appended claims.

In the following examples, the residual contents of VP and VA were determined by gas chromatography; K values are measured in 1% (weight/volume) ethanol solution at 25° C. and APHA color was measured as is by HUNTER Colorimeter.

The water tolerance of the PVP/VA copolymers was determined by HACH Ratio Turbidimeter, which uses three detectors to measure light: (1) scattered at 90° C., (2) transmitted by the sample, and (3) scattered in the forward direction. The turbidity value is derived by ratioing the 90° C. scattered signal against a weighted sum of the transmitted and forward scatter signals. The unit of measurement is the nephelometric turbidity unit (NTU) measured in such a solution: 10 g. product (as is) with 14.6 g. ethanol (so the polymer concentration was 20% w/v) and up to 200 ml of deionized water. The NTU value is directly proportional to the turbidity of the solution.

EXAMPLE 1

Improved Preparation of VP/VA (30:70) Copolymer in Isopropanol

After a 1-liter Buchi reactor was purged with nitrogen, 31.14 g. of VP, 68.05 g. of VA, 0.11 g. of tert-amyl-peroxy pivalate as LUPERSOL 554, 0.11 g. of 2,5-dimethyl-2,5-di(tertbutylperoxy) hexane as LUPERSOL 101 and 51.09 g. of isopropanol were pumped into the reactor. The components were stirred at 150 RPM for about 10 minutes and heated to 70OC., after which 0.95 g. of LUPERSOL 554, 0.95 g. of LUPERSOL 101 and 11.34 g. of isopropanol were added over a period of 5 hours and 72.67 g. of VP, 158.77 g. of VA and 116.27 g. of isopropanol were gradually and simultaneously added over a period of 3.5 hours.

Upon completion of VA monomer addition, 18.32 g. of VP and 9.20 g. of isopropanol were slowly added over a 1 hour period. After the above additions were completed, the reaction mixture was gently agitated at 70° C. for 2 hours and then the temperature was increased to 130° C. for 3 hours and the system was diluted to 50% solids with 161.05 g. of isopropanol gradually added over a 1.5 hour period. The reactor contents were then cooled to room temperature and the homogeneous copolymeric product discharged.

The VP/VA copolymer of about K 25.4 was recovered as a clear solution of 49.4% solids having APHA color of 37.2, moisture content of 0.08%, nitrogen 4.31% and both VP and VP monomer concentration was below 100 PPM.

COMPARATIVE EXAMPLE 2

Conventional Preparation of VPIVA (30:70) Copolymer in Isoproyanol

A 1-liter Buchi reactor was purged with nitrogen and 278.01 g. isopropanol, 40.25 g. VP, and 270.30 g. VA were charged into the reactor where the mixture was stirred and heated to 70° C. A first initiator feed consisting of 0.142 g. AIBN* dissolved in 0.40 g. isopropanol and 1.84 g. VP was then charged. At the same time the incremental feeding of VP was started in which the first feed of 12.37 g. VP was introduced over the period of one hour. Four subsequent VP feed additions, totalling 73.15 g. VP were then introduced in diminishing amounts at 2 hour intervals. Two hours after the initial introduction of initiator, four portions of 0.043 g. AIBN dissolved in 0.40 g. of isopropanol and 0.53 g. of VP were charged into the reactor at 2 hour intervals followed by seven portions of 0.086 g. AIBN dissolved in 0.40 g. of isopropanol and 1.05 g. VP also charged in 2 hour intervals.

* azobis(isobutyronitrile)

After the third initiator addition, the temperature was allowed to rise to 80° C. where it was maintained until completion of the reaction. The % solids in the reaction mixture was adjusted to 50% by addition of isopropanol and the resulting VP/VA heterogeneous copolymer in isopropanol was cooled to room temperature. The unrected VP monomer in the solution was 0.45% and the unreacted VA monomer was 0.95%.

EXAMPLE 3

Improved Preparation of VP/VA (30:70) Copolymer in Ethanol

After a 1-liter Buchi reactor was purged with nitrogen, 28.30 g. of VP, 71.40 g. of VA, 0.11 g. of 2,2-azobis(2-methylbutyronitrile) as VAZO 67, 0.11 g. of 2,5-dimethyl-2,5-di(tertbutylperoxy) hexane as LUPERSOL 101 and 51.34 g. of ethanol were pumped into the reactor. The components were stirred at 150 RPM for about 10 minutes and heated to 85° C., after which 0.95 g. of VAZO 67, 0.95 g. of LUPERSOL 101 and 11.34 g. of ethanol were added over a period of 5 hours and 66.02 g. of VP, 166.59 g. of VA and 116.85 g. of ethanol were gradually and simultaneously added over a period of 3.5 hours.

Upon completion of VA monomer addition, 16.64 g. of VP and 8.36 g. of ethanol were slowly added over a 1 hour period. After the above additions were completed, the reaction mixture was gently agitated at 85° C. for 2 hours and then the temperature was increased to 130° C. for 3 hours and the system was diluted to 50% solids with 161.05 g. of ethanol gradually added over a 1.5 hour period. The reactor contents were then cooled to room temperature and the homogeneous copolymeric product discharged.

The VP/VA copolymer of K 29 was recovered as a clear solution of 45.6% solids having APHA color of 17.8, moisture content of 0.11% and nitrogen 4.23%. The water tolerance of the product in 50 ml water was found to be 4.7 ntu. and VP or VA residual monomers were below 100 PPM.

COMPARATIVE EXAMPLE 4

Example 2 was repeated except that only 130 g. of AIBN were used in the initial initiator charge.

The resulting heterogeneous VP/VA copolymeric product having a K value of about 30 had a residual monomer content of 0.25% VP and 0.69% VA, an APHA color of 36 and water tolerance in 50 ml water of 72 ntu.

EXAMPLE 5

Improved Preparation of VP/VA (50:50) Copolymer in Ethanol

After a 1-liter Buchi reactor was purged with nitrogen, 50.25 g. of VP, 62.81 g. of VA, 0.13 g. of 2,2-azobis(2-methylbutyronitrile) as VAZO 67, 0.13 g. of 2,5-dimethyl-2,5-di(tertbutylperoxy) hexane as LUPERSOL 101 and 58.31 g. of ethanol were pumped into the reactor. The components were stirred at 150 RPM for about 10 minutes and heated to 85° C., after which 0.95 g. of VAZO 67, 0.95 g. of LUPERSOL 101 and 11.09 g. of ethanol were added over a period of 5 hours and 89.33 g. of VP, 111.66 g. of VA and 100.97 g. of ethanol were gradually and simultaneously added over a period of 3.5 hours.

Upon completion of VA monomer addition, 34.90 g. of VP and 17.53 g. of ethanol were slowly added over a 1 hour period. After the above additions were completed, the reaction mixture was gently agitated at 85° C. for 2 hours and then the temperature was increased to 130° C. for 3 hours and the system was diluted to 50% solids with 161.05 g. of ethanol gradually added over a 1.5 hour period. The reactor contents were then cooled to room temperature and the homogeneous copolymeric product discharged.

The VP/VA copolymer of K 41.3 was recovered as a clear solution of 57.5% solids having APHA color of 48.3, moisture content of 0.27% and nitrogen 7.17%. The water tolerance of the product in 200 ml water was found to be 19 ntu. and residual monomer was below 100 ppm.

COMPARATIVE EXAMPLE 6

Conventional Preparation of VP/VA (50:50) Copolymer

Example 2 was repeated except that the VA to VP proportion in the initial charge was 50/50.

The resulting heterogeneous VP/VA compolymer of K 40 had residual VP of 0.25% and VA of 0.81%, an APHA color of 43 and water tolerance in 200 ml water of 128 ntu.

EXAMPLE 7

Improved Preparation of VP/VA (50:50) Copolymer in Isopropanol

After a 1-liter Buchi reactor was purged with nitrogen, 44.22 g of VP, 56.19 g. of VA, 0.12 g. of 2,2-azobis(2-methylbutyronitrile) as VAZO 67, 0.12 g. of 2,5-dimethyl-2,5-di(tertbutylperoxy) hexane as LUPERSOL 101 and 40.79 g. of isopropanol were pumped into the reactor. The components were stirred at 150 RPM for about 10 minutes and heated to 85° C., after which 0.93 g. of VAZO 67, 0.93 g. of LUPERSOL 101 and 11.09 g. of isopropanol were added over a period of 5 hours and 89.78 g. of VP, 114.09 g. of VA and 80.01 g. of isopropanol were gradually and simultaneously added over a period of 3.5 hours.

Upon completion of VA monomer addition, 44.67 g. of VP and 17.53 g. of ethanol were slowly added over a 1 hour period. After the above additions were completed, the reaction mixture was gently agitated at 85° C. for 2 hours and then the temperature was increased to 130° C. for 3 hours. The reactor contents were then cooled to room temperature and the homogeneous copolymeric product discharged.

The VP/VA copolymer of K 26.8 was recovered as a clear solution of 49.7% solids having APHA color of 29.7, moisture content of 0.09% and nitrogen 6.54%. The water tolerance of the product in 200 ml water was found to be 4.3 ntu. and VP and VP residual monomers were below 100 ppm.

EXAMPLE 8

Conventional Preparation of VP/VA (60:40) Copolymer

A 1 liter kettle equipped as described in Example 1 was purged with nitrogen for 15 minutes after which 250 gm of isopropanol were charged under a blanket of nitrogen. 125 grams of vinylpyrrolidone and 100 grams of vinyl acetate were charged into the dropping funnel. After the kettle was heated to a gentle reflux, 0.2 ml t-butylperoxypivalate was added, after which the VP/VA mixture in the droppping funnel was fed in 4 portions over 2 hours with one addition of 0.2 ml t-butylperoxypivalate. At the end of 2 hours, 0.25 ml t-butylperoxypivalate and 25 g. of VP were added to the kettle. The kettle was kept at reflux temperature for an additional 2 hours with one charge of 0.2 ml t-butylperoxypivalate. The kettle was then cooled down and discharged. Analysis indicated that the product had a solids content of 47.6 wt. % and a K value of 26.1.

The resulting heterogeneous VP/VA copolymer was found to have 0.25% residual VP and 0.81% residual VA, an APHA color of 43 and water tolerance in 200 ml water of 128 ntu.

EXAMPLE 9

Improved Preparation of VA (70:30) Copolymer in Ethanol

After a 1-liter Buchi reactor was purged with nitrogen, 54.41 g. of VP, 37.42 g. of VA, 0.12 g. of 2,2-azobis(2-methylbutyronitrile) as VAZO 67, 0.12 g. of 2,5-dimethyl-2,5-di(tertbutylperoxy) hexane as LUPERSOL 101 and 47.52 g. of ethanol were pumped into the reactor. The components were stirred at 150 RPM for about 10 minutes and heated to 85° C., after which 0.93 g. of VAZO 67, 0.93 g. of LUPERSOL 101 and 11.21 g. of ethanol were added over a period of 5 hours and 110.47 g. of VP, 75.98 g. of VA and 93.67 g. of ethanol were gradually and simultaneously added over a period of 3.5 hours.

Upon completion of VA monomer addition, 70.66 g. of VP and 35.50 g. of ethanol were slowly added over a 1 hour period. After the above additions were completed, the reaction mixture was gently agitated at 85° C. for 2 hours and then the temperature was increased to 130° C. for 3 hours and the system was diluted to 50% solids with 161.05 g. of ethanol gradually added over a 1.5 hour period. The reactor contents were then cooled to room temperature and the substantially homogeneous copolymeric product discharged.

The VP/VA copolymer of K 35.1 was recovered as a clear solution of 49.0% solids having APHA color of 13.4, moisture content of 0.21% and nitrogen 8.60%. The water tolerance of the product in 200 ml water was found to be 1.6 ntu. and VP and VA residual monomers were below 100 ppm.

COMPARATIVE EXAMPLE 10

A commercial reaction kettle was purged 3 times with nitrogen, after which 947 gallons of ethanol were charged at 45° C. under agitation followed by 215 gallons of N-vinylpyrrolidone and 1144 gallons of vinyl acetate; the later introduced under constant agitation over a period of about 5 minutes. The mixture was purged with nitrogen and the temperature raised to 70° C.

A solution of 5 gallons of N-vinylpyrrolidone in 2265 grams of azo-bis(isobutyronitrile) initiator was prepared and 2 gallons of the resulting mixture was charged into the reactor followed by a second 2 gallon charge after 1 hour had expired. After 2 hours, an additional 110 gallons of N-vinylpyrrolidone was introduced into the reactor followed by the remaining portion of the initiator.

6 gallons of an initiator solution (680 grams per 2 gallons of N-vinylpyrrolidone) was separately made up and 2 callons of this was charged to the reactor at 75° C. followed by 55 gallons of N-vinylpyrrolidone and another 2 gallons of initiator solution within the following hour. These additions were made under a constant nitrogen purge. Finally, after 1 more hour the final 2 gallons of initiator solution was charged at a temperature between about 80° and about 85° C. and the reaction mixture agitated for an additional 2 hours and then cooled.

The N-vinylpyrrolidone/vinyl acetate copolymeric product having random homogeneous monomer distribution contained a total of 1.66% unreacted monomers.

COMPARATIVE EXAMPLE 11

The above procedure (Example 10) was repeated using 1525 gallons of ethanol, 540 gallons of N-vinylpyrrolidone and 818 gallons of vinyl acetate in the initial charge. The N-vinylpyrrolidone/vinyl acetate copolymer contained 0.78% unreacted monomers.

COMPARATIVE EXAMPLE 12

The procedure outlined in Example 10 was repeated and the heterogeneous VP/VA copolymeric product of this example was post treated by the gradual addition of 3 gallons of t-amylperoxy pivalate (LUPERSOL 554) for a period of 1.5 hours at about 90° C. The resulting N-vinylpyrrolidone/vinyl acetate copolymeric product had a random monomer distribution and contained 0.66 wt. unreacted monomers.

EXAMPLE 13

Improved Preparation of VP/VA (70:30) Copolymer in Isopropanol

After a 1-liter Buchi reactor was purged with nitrogen, 56.53 g. of VP, 34.02 g. of VA, 0.11 g. of 2,2-azobis(2-methylbutyronitrile) as VAZO 67, 0.11 g. of 2,5-dimethyl-2,5-di(tertbutylperoxy) hexane as LUPERSOL 101 and 88.54 g. of isopropanol were pumped into the reactor. The components were stirred at 150 RPM for about 10 minutes and heated to 85° C., after which 0.95 g. of VAZO 67, 0.95 g. of LUPERSOL 101 and 11.34 g. of isopropanol were added over a period of 5 hours and 131.90 g. of VP, 79.39 g. of VA and 203.66 g. of isopropanol were gradually and simultaneously added over a period of 3.5 hours.

Upon completion of VA monomer addition, 47.11 g. of VP and 45.41 g. of isopropanol were slowly added over a 1 hour period. After the above additions were completed, the reaction mixture was gently agitated at 85° C. for 2 hours and then the temperature was increased to 130° C. for 7 hours. The reactor contents were then cooled to room temperature and the homogeneous copolymeric product discharged.

The VP/VA copolymer of K 30 was recovered as a clear solution of 49.8% solids having APHA color of 21.1, and nitrogen 8.26%. The water tolerance of the product in 200 ml water was found to be 0.7 ntu. and both residual monomers were below 100 ppm.

EXAMPLES 14-19

The following initiators were tested and compared with the present 2,5-dimethyl-2,5-di(t-butylperoxy) hexane initiator which is present at the high temperature stage of the present process. In each of the following tests, the copolymer sample was a 50% VP/VA copolymer in ethanol solution and the copolymer sample contained 70 wt. t N-vinylpyrrolidone and 30 wt. % vinyl acetate. The VP/VA copolymer was analyzed at this point for monomer content and was found to have 0.67 wt. % VA monomer and 0.41 wt. % VP monomer; i.e. a total residual monomer content of 1.08 wt. %. This copolymer was subjected to treatments with various initiators at the elevated temperatures reported in the following Table. The amounts of initiator employed were based on total monomers, the half-life time indicates the time for 50% decomposition of the initiator and residual vinyl acetate and vinylpyrrolidone is separately reported in each case.

TABLE

| Ex. | Initiator | Amount | Temp | Half-life Time | Res. VA | Res. VP |
|---|---|---|---|---|---|---|
|  | VP/VA copolymer Sample Tested Contained |  |  |  | 0.67% | 0.41% |
| 14 | Succinic Acid Peroxide | 0.1% | 90° C. | 60 min. | 0.54% | 0.30% |
|  |  | 0.1% | 107° C. | 15 min. | 0.55% | 0.27% |
|  |  | 0.1% | 130° C. | 3 min. | 0.50% | 0.25% |
| 15 | Lupersol TAEC [(OO-t-amyl O-(2-ethylhexyl) monoperoxy-carbonate] | 0.1% | 117° C. | 60 min. | 0.36% | 0.13% |
|  |  | 0.1% | 129° C. | 15 min. | 0.30% | 0.13% |
| 16 | Lupersol 80 [t-Butyl-peroxy-2-ethyl-hexanoate] | 0.1% | 116° C. | 15 min. | 0.20% | 0.043% |
|  |  | 0.5% | 116° C. | 15 min. | 0.037% | <0.01% |
| 17 | Lupersol 531 [1,1-Di-(t-amylperoxy)cyclo-hexane] | 0.1% | 124° C. | 15 min. | 0.15% | 0.025% |
|  |  | 0.5% | 129° C. | 15 min. | 0.021% | <0.01% |
| 18 | Lupersol 575 [t-Amyl-peroxy-2-ethyl-hexanoate] | 0.1% | 103° C. | 15 min. | 0.25% | 0.047% |
|  |  | 0.5% | 103° C. | 15 min. | 0.013% | <0.01% |
| 19 | Lupersol 101 [2,5-Dimethyl-2,5-di-(t-butylperoxy) hexane] | 0.1% | 130° C. | 190 min. | 0.059% | 0.009% |
|  |  | 0.5% | 130° C. | 190 min. | <0.01% | <0.01% |

The above results indicate that Lupersol 101 [2,5-dimethyl-2,5-di(t-butylperoxy) hexane] is markedly more efficient and is needed to reduce both VA and VP in the homogeneous copolymer to below 100 ppm.

What is claimed is:

1. An anhydrous liquid phase process for the copolymerization of vinyl pyrrolidone (VP) and vinyl acetate (VA) monomers in a high state of purity which comprises:
   (a) reacting a $C_2$ to $C_3$ alcoholic solution containing said VA monomer and between about 60 and about 80 wt. % portion of total VP monomer in the presence of between about 0.05 and about 0.3 wt. % of a 10W temperature free radical initiator selected from the group consisting of tertamylperoxy pivalate and 2,2-azobis(2-methylbutyronitrile) or a mixture thereof for a period of from about 5 to about 10 hours, at a temperature between about 60° and about 110° C.;
   (b) gradually adding the remaining VP monomer in $C_2$ to $C_3$ alcohol solution at reaction temperature after the addition of the VA monomer is complete;
   (c) raising the temperature of the resulting reaction mixture to between about 110° and about 150° C.;
   (d) continuing the polymerization reaction at said higher temperature in the presence of from about 0.11 to about 0.6 wt. %, based on total monomers, of 2,5-dimethyl-2,5-bis(tert-butylperoxy)-hexane high temperature mitiator and
   (e) cooling the resulting reaction mixture and recovering a homogeneous N-vinylpyrrolidone/vinyl acetate copolymer solution containing not more than 100 ppm of residual vinyl acetate or N-vinylpyrrolidone.

2. The process of claim 1 wherein/on temperature said initiator is t-amylperoxy pivalate.

3. The process of claim 2 wherein the monomer solution in step (a) contains between about 50 and about 80% VP+VA.

4. The process of claim 2 wherein the initiator concentration during the lower and higher temperature stages of the reaction is between about 0.15 and about 0.5 wt. % based on monomers.

5. The process of claim 4 wherein said initiator in step (a) comprises a mixture of tert-amylperoxy pivalate and/or 2,2-azobis(2-methylbutyronitrile) with 2,5-dimethyl-2,5-di(butylperoxy) hexane.

6. The process of claim 1 wherein said lower temperature in step (a) is between about 65° and about 85° C. and said higher temperature in step (c) is between about 120° and about 135° C.

7. The process of claim 1 wherein between about 5 and about 30% of the total initiator and monomer solution charge to the reactor is precharged and mixed before reaction temperature is reached.

8. The process of claim 1 wherein the reactor is charged with a minor portion of the total vinylpyrrolidone monomer solution after the addition of vinyl acetate monomer is completed.

9. The process of claim 1 wherein the weight ratio of vinylpyrrolidone monomer to vinyl acetate monomer charged to the reactor is between 25–75:75–25.

10. The process of claim 9 wherein the weight ratio of vinylpyrrolidone monomer to vinyl acetate monomer is 50:50.

11. The process of claim 9 wherein the weight ratio of vinylpyrrolidone monomer to vinyl acetate monomer is 30:70.

12. The process of claim 9 wherein the weight ratio of vinylpyrrolidone monomer to vinyl acetate monomer is 70:30.

13. The process of claim 1 wherein initiator is gradually added during the course of the reaction.

14. The process of claim 1 wherein the copolymer content after step (d) is adjusted to about 50% by addition of said $C_2$ to $C_3$ alcohol.

* * * * *